United States Patent
Young

[11] Patent Number: 5,986,553
[45] Date of Patent: Nov. 16, 1999

[54] FLOW METER THAT MEASURES SOLID PARTICULATE FLOW

[75] Inventor: Gary C. Young, Cedar Rapids, Iowa

[73] Assignee: Gyco, Inc., Cedar Rapids, Iowa

[21] Appl. No.: 08/810,429

[22] Filed: Mar. 4, 1997

[51] Int. Cl.$^6$ ................................................ G08B 21/00
[52] U.S. Cl. .................. 340/606; 73/861.18; 73/861.25; 73/861
[58] Field of Search .................................... 340/606, 600, 340/603; 73/861.18, 861.25, 861; 342/104, 115

[56] References Cited

U.S. PATENT DOCUMENTS

| | | | |
|---|---|---|---|
| 3,554,030 | 1/1971 | Peronneau | 73/194 |
| 3,881,353 | 5/1975 | Fathauer | 73/194 |
| 4,091,385 | 5/1978 | Petlevich et al. | 343/8 |
| 4,147,059 | 4/1979 | Fathauer | 73/861.25 |
| 4,476,874 | 10/1984 | Taenzer et al. | 128/663 |
| 4,726,235 | 2/1988 | Leffert et al. | 73/861.04 |
| 4,944,189 | 7/1990 | Nakajima et al. | 73/861.25 |
| 5,076,278 | 12/1991 | Vilkomerson et al. | 128/662.03 |
| 5,369,998 | 12/1994 | Sowerby | 73/861.04 |
| 5,540,230 | 7/1996 | Vilkomerson | 188/662.04 |
| 5,550,537 | 8/1996 | Perdue | 340/870.01 |

Primary Examiner—Julie Lieu
Attorney, Agent, or Firm—Jones, Day, Reavis & Pogue

[57] ABSTRACT

A non-contact solids flow meter for measuring solid particulate flow is comprised of a flow tube, a sensor, and an indicator. The product enters the flow tube at one end and flows downward by gravity past the sensor and then exits the flow tube at the bottom. The sensor is placed in a sensor tube at an angle to the flow of particulate solids. As the product passes the sensor signal (low microwave energy), this energy upon contacting the particulates undergoes a Doppler shift which is detected by the sensor. The width of the sensor beam has to be at least the diameter of the flow tube so that it covers the entire cross-sectional area of the flow tube. In this manner, all particulate materials flowing through the flow tube come in contact with the beam and are thus reflected. The instrument is calibrated and algorithms determined from the calibration to cause the indicator to provide a best fit function over the output range of the indicator.

20 Claims, 5 Drawing Sheets

FLOW METER THAT MEASURES SOLID PARTICULATE FLOW

BACKGROUND OF THE INVENTION

1. Field of the Invention

This invention relates generally to flow measurement of particulate streams and in particular to a Dopplar flow meter and method for flow measurement of particulate streams.

2. Description of Related Art Including Information Disclosed Under 37 CFR 1.97 and 1.98

Flow measurement of particulate streams such as wet cakes, grains, cereals, dry powders, minerals, pharmaceuticals, dairy powders, chemicals, spices, snack foods, cement, resins, plastics, fibrous materials, and others is critical to the operation and optimization of a given process. A non-contact flow meter is of great importance since measurements are obtained without interfering with the flow of product through the process transfer line. For flow measurement of some products through transfer lines, this is critical since any obstruction in the line can cause buildup and eventual pluggage. In addition, no degradation of the material occurs since the flow is unobstructed. Also, the integrity of the process is maintained with a non-contact flow meter. For example, with food and pharmaceutical manufacturing, a truly non-contact solids flow meter obtains measurements without any contamination of the process since, being a non-contact device, the integrity of the process is never compromised. This factor is important when considering food, pharmaceutical, mineral, and chemical manufacturing.

Some typical applications for flow/quantity measurements are: feed to dryers, discharge from dryers, feed to milling operations, flow to mixers, flow from dust collectors, flow from conveyors, loading/unloading of railcars, loading/unloading of trucks, loading/unloading of barges, flow of grains through ducts, cement loading/unloading, flow of plastic granules, flow from cyclones, flow in pneumatic transfer lines, loading/unloading of silos, and feed to reactors to mention a few applications.

In U.S. Pat. No. 4,091,385, a Doppler radar flow meter is disclosed in which the flow meter comprises a radar transmitter and receiver that respectively radiates radio waves at a predetermined microwave frequency at least partially through a fluid and receive at least a portion of the radio waves backscattered by at least some of the particulate matter in the path of the radiated radio waves. A signal processor connected to the receiver produces a signal related to the Doppler's shift in frequency between the backscattered radio waves and the radiated radio waves and, thus, the frequency is related to the velocity of flow of the particulate matter being measured. In particular in this case, the flow meter is used for velocity of flow of fluids such as blood in conduits such as blood vessels.

U.S. Pat. No. 5,550,537 discloses an apparatus for measuring mass flow rate of a moving medium using Doppler radar. The patent discloses a non-intrusive mass flow rate meter that includes a transceiver that transmits an electromagnetic signal of known frequency and power to illuminate a portion of moving material. The transceiver detects the magnitude and the Doppler shift of the electromagnetic signal that is reflected by material moving along the process flow as it passes through the electromagnetic field established by the signal. The transceiver then combines the magnitude of the reflected electromagnetic signal along with the Doppler shift between the frequency of the transmitted and reflected electromagnetic signals to generate an output signal related to the mass flow rate of the material. The problem with the U.S. Pat. No. 5,550,537 patent is that only a portion of the moving material is illuminated. This creates errors in the mass flow rate and thus in the quantity of material that is passing through the conduit.

SUMMARY OF THE INVENTION

The present invention overcomes the disadvantages of the prior art by providing a non-contact mass flow meter for measuring the flow of particulate streams through ducts, chutes, or pipes utilizing a Doppler-radar sensor, a unique flow tube, a flow rate and totalizer indicator, and an algorithm to convert the mass flow rate signal to total mass flow rate. In the present invention, the solid particulate matter flows along a first hollow conduit with a second hollow conduit having at least the same diameter as the first conduit and being joined to the first conduit at an angle. At least one sensor is associated with the second hollow conduit and includes a transmitter of electromagnetic energy for radiating the entire particulate matter flow path formed by the first conduit such that substantially all of the particulate matter contributes to and forms backscattered energy. A receiver receives the backscattered energy and generates an electrical signal that is proportional to the concentration of solid particulate matter flowing in the first hollow conduit. A processor is coupled to at least one sensor for generating an output signal representative of the concentration of the solid particulate matter.

In the preferred embodiment, the solid particulate matter flows past the sensor at a substantially constant velocity that is achieved by placing a source of the particulate matter a predetermined distance above the sensor for achieving the substantially constant velocity by gravity flow. In another embodiment, a source of pneumatic pressure is coupled to the first conduit for conveying the particulate matter past the sensor at the substantially constant velocity.

In order to form a non-contact flow meter, a sightglass is interposed in the second hollow conduit between the sensor and the particulate matter. The electrical signal generated by the receiver is a non-linear signal measured in either milliamps or volts. The processor converts the milliamp or volt signal into a pounds-per-hour mass flow rate. A totalizer generates a total quantity value of the material delivered.

The processor includes a memory for storing at least one algorithm for converting the signal generated by the receiver into a continuous range of values to a pounds-per-hour mass flow rate. In the preferred embodiment, the memory stores a first algorithm for converting a signal generated by the receiver in a first range of values to a pounds-per-hour mass flow rate and stores a second algorithm for converting the signal generated by the receiver in a second continuous range of values to a pounds-per-hour mass flow rate to enhance accuracy of the flow meter.

In the preferred embodiment, the first algorithm has the form of $Y=aX^b$, where Y=pounds/hour, X=mllliamps (volts), and a and b are constants and the second algorithm has the form of $Y=a_0+a_1X+a_2X^2+a_3X^3+a_4X^4$ where Y=pounds/hour, X=milliamps, and $a_0$, $a_1$, $a_2$, $a_3$, and $a_4$ are constants.

The processor may be an industrial computer or a smart indicator. Further, a central processing unit, which may be a personal computer or equivalent, is coupled between the receiver and the industrial computer for calculating constants for the first and second algorithms for use by the industrial computer or smart indicator. Alternatively, the processor itself may include a central processing unit for calculating the constants for the first and second algorithms and generating mass flow rate in pound-per-hour. It further may have a converting means in the central processing unit for converting the mass flow rate to total pounds.

In still another embodiment, first and second sensors may be associated with the second conduit with the processor being coupled to both the first and second sensors for generating an output signal that is representative of the concentration of the particulate matter and, therefore, that is related to mass flow rate.

Thus, the present invention relates to a flow meter for measurement of the mass flow rate of solid particulate matter comprising a first hollow conduit forming a flow path along which the solid particulate matter flows, a second hollow conduit having at least the same diameter as the first conduit, one of the conduits being joined to the other conduit at an angle, at least one sensor associated with the second hollow conduit, at least one sensor including a transmitter of electromagnetic energy for radiating the entire particulate matter flow path formed by the first conduit such that substantially all of the particulate matter contributes to and forms backscattered energy, a receiver for receiving the backscattered energy and generating an electrical signal that is proportional to the concentration of solid particulate matter flowing in the first hollow conduit, and a processor coupled to the at least one sensor for generating an output signal representative of the concentration of the solid particulate matter.

The invention also relates to a method of measuring mass flow rate of a solid particulate matter comprising the steps of conveying the particulate matter through a first hollow conduit, transmitting electromagnetic energy through a second hollow conduit attached to the first hollow conduit at an angle, and having at least the same diameter as the first hollow conduit, radiating substantially all of the particulate matter in the first conduit as it passes the second hollow conduit to form a signal from backscattered electromagnetic energy, receiving the backscattered energy signal from the particulate matter and converting the received backscattered energy signal to mass flow rate in pounds-per-hour.

BRIEF DESCRIPTION OF THE DRAWINGS

These and other features of the present invention will be more flily disclosed when taken in conjunction with the following DETAILED DESCRIPTION OF THE PREFERRED EMBODIMENT(S) in which like numerals represent like elements and in which.

DETAILED DESCRIPTION OF THE PREFERRED EMBODIMENT(S)

Figure 1:
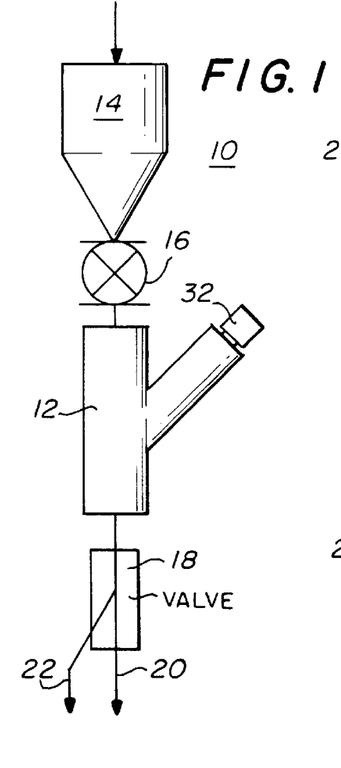
FIG. 1 is a diagrammatic representation of a typical flow meter application for the non-contact mass flow meter of the present invention in a gravity flow application.

FIG. 1 shows a typical flow meter application for the non-contact mass flow meter 10 in a gravity flow application. A product such as a cereal flows into a product bin 14 and a rotary air lock 16 at the bottom of the bin discharges the cereal to a flow meter 12. The flow meter 12 measures mass rate (pounds/hour) and quantity (pounds). The product discharged from the bottom of the flow meter 12 masses through a manual divert valve 18 which enables the product to follow either path 20 or path 22.

It will be noted that the distance from the solids feed equipment (in this case the rotary air lock 16) to the flow meter 12 would be kept the same for calibration and the actual application or installation into an industrial plant. This would ensure that the initial particulate velocities would be nearly identical at the flow meter both during the calibration conditions and the end use conditions under which the meter would finally operate.

The flow tube design is one of the important attributes of the present invention. It is important that the low-energy microwave beam emitted from the sensor 32 shown in FIG. 1 and FIGS. 2A, 2B, and 2C cover the entire cross-sectional area of the flow tube 24. In this manner, substantially all particulate materials flowing through the flow tube 24 come in contact with the beam and thus the reflected Doppler-shifted energy picked up by the sensor 32 will be a signal truly representative of the solids flow through the flow tube 24.

Figures 2A, 2B:
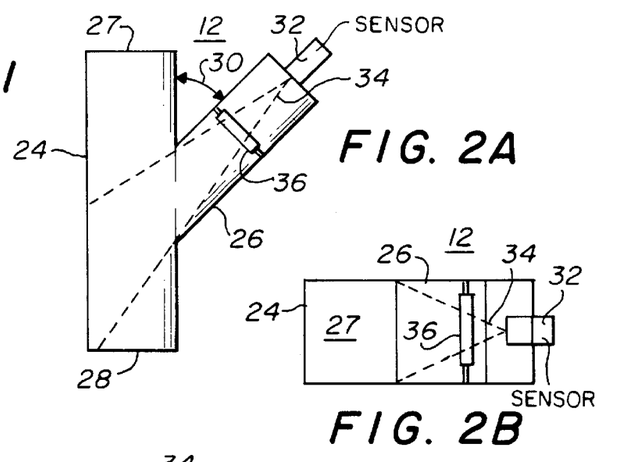
FIG. 2A is a side view of a typical flow tube and attached sensor tube.
FIG. 2B is a top view of the rectangular flow tube with the sensor tube attached.
Figure 2C:
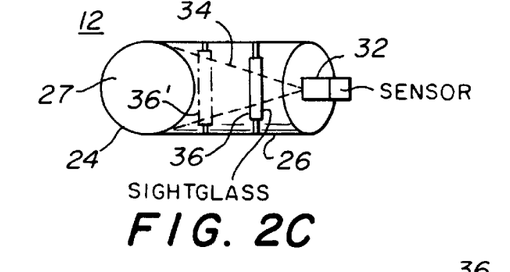
FIG. 2C is a top view of a circular flow tube with a sensor tube attached.

Thus as can be seen in FIG. 2A, the non-contact solids flow meter flow tube and sensor arrangement 12 comprises the material flow tube 24 having a product inlet 27 and a product outlet 28 and is attached at an angle 30 to a sensor tube 26 that has a sensor 32 mounted thereon for transmitting the low-energy microwave beam 34 through a sightglass 36 and across the entire cross-sectional area of the flow tube 24. The angle 30 may vary from about 10° to 90°. Further the flow tube 24 may be vertical as shown or at an angle to the horizontal. For example only, the flow tube 24 may be at an angle of 60° to the horizontal. As shown in the top views 2B and 2C, the top view of a rectangular flow tube 24 and a circular flow tube 24, respectively, the beam 34 from sensor 32 in each case covers the entire cross-sectional area of the flow tube. Thus, the tube 26 holding the sensor 32 is of the same diameter as the flow tube 24. Note that the sensor 32 in both FIGS. 2B and 2C is located at a distance from the flow tube path such that the beam width covers the entire diameter or cross-sectional area of the flow tube. In such case, a back-reflected Doppler-shifted energy signal is representative of the entire solids flow. It can be seen then that the sensor 32 must be properly positioned at the right distance from the centerline of flow tube 24 or the beam 34 will be too narrow to cover all of the material in the flow tube or will be so far away that the maximum energy would not be received from the reflected energy from the flowing material. In each case, the beam 34 passes through a sightglass 36 to form a non-contact flow meter.

Figure 3:
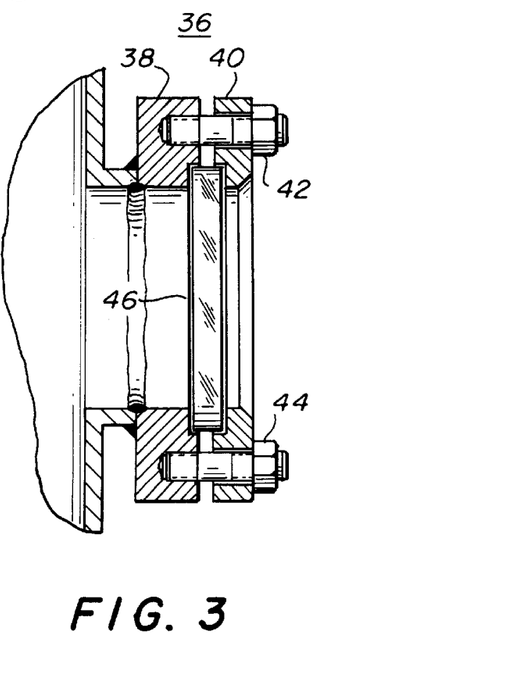
FIG. 3 is a cross-sectional view of a typical sightglass that could be used with the present invention.

FIG. 3 discloses a typical sightglass 36 that can be positioned as shown in FIGS. 2A, 2B, and 2C in the sensor tube 26. Note in FIG. 2C that the sightglass 36 may be positioned at any place along beam 34, such as at 36', so long as it passes the entire beam 34. The sightglass 36 is mounted between brackets 38 and 40 that are held together by bolts and nuts 42 and 44. Sightglass 36 is well known in the art and may be of a type entitled Series NW available in different diameters and different types of mountings.

Figure 4:
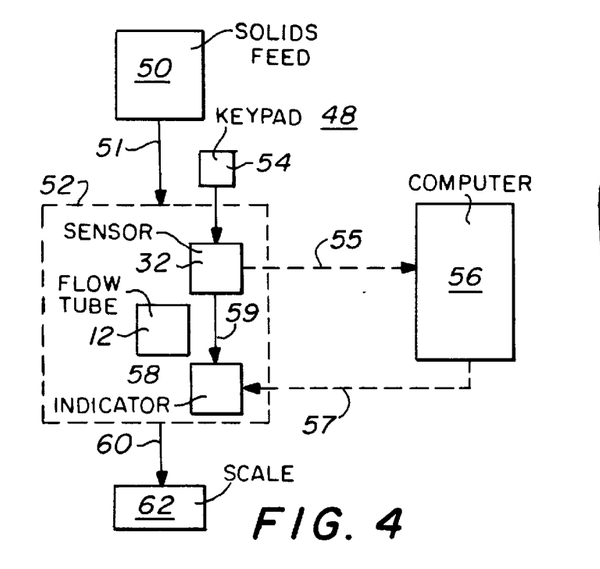
FIG. 4 illustrates the equipment necessary to calibrate the solids flow meter of the present invention.

FIG. 4 illustrates a calibration circuit 48 containing equipment set up to calibrate the solids flow meter 52 illustrated in phantom lines. This flow meter may be of the type disclosed in U.S. Pat. 5,550,537 except that the flow tube and the sensor tube have the same diameter so that substantially all of the particulate matter can be illuminated by the radar or high frequency beam. As can be seen in FIG. 4, solids feed equipment 50 supplies the particulate solid (mass flow at a constant mass rate to meter 52) through a duct 51. The flow meter 52 is comprised of the flow tube 12, sensor 32, and industrial computer or smart indicator 58 with the mass flow from the flow meter 52 passing through duct 60 and weigh scale 62 for measuring the mass rate through the flow meter 52. Sensor 32 output on line 55 is connected to computer 56 that is typically used to analyze the calibration data and compute an algorithm for the industrial computer or smart indicator 58 via computer output 57. Usually two, and preferably more than two, mass flow rates and associated sensor output data are collected and used to determine an algorithm. Once the calibration procedures have been completed and the algorithm placed into industrial computer or smart indicator 58, the sensor 32 output is connected at 59 to industrial computer or smart indicator 58 that contains the algorithm and communication connections 55 and 57 are not used.

The sensor 32 could be a Granuflow GMR130 microwave solids flow indicator made by Endress+Hauser or a Model SSI microwave solids flow indicator by Monitor Manufacturing Company or equivalent. Computer 56 could be a personal computer such as a Gateway 2000 Pentium computer or equivalent. Industrial computer 58 could be an Allen Bradley PLC (programmable logic controller) or Leukhardt Systems, Inc. industrial computer or a Contec Microelectronics, Inc. industrial computer or equivalent. If a smart indicator 58 is used, it could be an Apollo Intelligent Meter Red Lion Model IMP23-107 or equivalent. The weigh scale 62 could be any typical load cell weight scale or equivalent. The solids feed equipment 50 could be a hopper with a vibratory feeder or volumetric feeder by K-Tron America used with a rotary air lock or equivalent. The flow tube 12 has an input that is kept at a constant distance from the solids feed equipment 50 during the calibration procedure and is maintained at a fixed or equivalent value for the final commercial installation.

Thus, after calibration, any particulate solid fed to the flow meter are indicated by sensor 32 and the sensor output on line 59 is sent to the industrial computer or smart indicator 58 displaying mass rate (sensor output is converted to mass rate via an algorithm determined from calibration) and the mass quantity is displayed by integrating the mass flow rate over time. The sensor 32 has a keypad 54 connected thereto for entering calibration data. The keypad is described in U.S. Pat. 5,550,537, which is incorporated herein by reference in its entirety.

With the equipment of the type as indicated earlier and with the sensor tube being at a 35° angle from the vertical with respect to the flow tube as illustrated in FIG. 2A, a vibratory feeder with variable speed controls was used to keep a constant mass rate to the meter 52. The product, as an example, was regular table rolled oats No. 5, ConAgra, Inc., with a bulk density of 25.38–28.84 pounds per cubic foot.

The solids feed equipment 50 was adjusted until a known 745.9 pounds/hour of rolled oats was being fed to the flow meter 52 at constant mass rate. The sensor 32 was set for amplification by pressing "H" key on keypad 54 and then the amplification set at coarse adjustment −2 and then the fine adjustments made through keyboard 54, as well known in the art, until an LED indicates 100% or 20 milliamps output from the sensor 32. The sensor is then advanced to the calibration mode through keypad 54.

With the sensor 32 in the calibration mode, the feed in flow path 52 was stopped. With no material flowing to the flow meter 52, the +/−keys on the keypad 54 were adjusted until an LED on the sensor 32 indicates 0% output or 4.0 milliamps. The "E" key on the keypad 54 is pressed once and the LED flashes for about five seconds to accept zero point. Any previous points are also cleared by pressing the plus (+) and minus (−) keys simultaneously and holding for 3-seconds.

Next, the feed through conduit 51 is set at 745.9 pounds/ hour and the plus/minus keys on keypad 54 are adjusted until the LED displays 100% or 20 milliamps. The "E" key is then pressed once and the LED flashes for about five seconds. Next, the "H" key on the keypad 54 is depressed until at damping mode. Then (+) or (−) keys are depressed until damping mode is set at two seconds. Then, the "H" key is pressed until the unit returns to the run mode. The mass flow through the conduit 51 is then set by adjusting the solids feed equipment 50 to 727.4 pounds/hour (weigh scale 62 will indicate pounds collected over the time interval measured using a stop watch) and the sensor 32 output (milliamps) is measured on connection 55 to computer 56 for several minutes. This calibration data point is used to begin a table such as that shown in Table I. This calibration data point is shown as the first two columns where the average output from the sensor 32 was 19.21 milliamps at the constant mass rate of 727.4 pounds/hour. Thus there is a data pair (mass rate and corresponding sensor output) which in this case is 727.4/hour and 19.21/milliamps.

This procedure is repeated for another different mass flow rate to obtain the average output from the sensor 32 corresponding to the new mass flow rate. Again, a table can be created shown in the first two columns in Table I for as many data pairs as necessary to obtain the accuracy desired.

TABLE I

| Sensor Output (milliamps) | Mass Flow Rate (lbs/hr) | (mA) | (lbs/hr) | |
|---|---|---|---|---|
| 3.90 | 0. | 3.90 | 0.0 | Eq(2) |
| 6.30 | 62.5 | 6.00 | 55.0 | Eq(2) |
| 9.34 | 141.8 | 8.00 | 98.6 | Eq(1) |

TABLE I-continued

| Sensor Output (milliamps) | Mass Flow Rate (lbs/hr) | (mA) | (lbs/hr) | |
|---|---|---|---|---|
| 11.32 | 213.7 | 10.00 | 161.9 | Eq(1) |
| 14.51 | 357.8 | 12.00 | 242.8 | Eq(1) |
| 15.08 | 403.1 | 14.00 | 341.9 | Eq(1) |
| 16.94 | 501.8 | 16.00 | 460.0 | Eq(1) |
| 19.08 | 681.8 | 18.00 | 597.6 | Eq(1) |
| 19.21 | 727.4 | 20.00 | 755.2 | Eq(1) |
| 20.00 | 745.9 | | | |

With that information in the first two columns of Table I, the data pairs are available (mass rate, sensor output) as necessary to obtain an accurate function (algorithm) for obtaining data pairs between these experimental data pairs (interpolation) and beyond these data pairs (extrapolation). A regression analysis is used to analyze these data pairs and find a model or algorithm to predict new values of the dependent variable (mass flow rate) for other values of the independent variable (milliamps).

From the first two columns, using data pairs with milliamps from 9.34 through 20.00, the value of the constants a and b for the algorithm or power equation $Y=aX^b$ can be determined by simple regression analysis, which is a well-known procedure for relating one dependent variable to one independent variable by minimizing the sum of the squares of the residuals for the fitted equation or line. The value for "a" was determined to be a=0.97247476 and "b" was determined to be b=2.22144851. The coefficient of determination (COD), which is the measure of the fraction of the total variance accounted for by the model equation was 0.99731366. Thus, using the power equation (1) $Y=aX^b$ with the values of the constants a and b as described above, a close fit between the predicted data pairs and the experimental data pairs was found as shown in Table I between 8 miluliamps through 20 milliamps. These data pairs were then placed into the smart indicator 58 (FIG. 4) as equation (1) in a manner well known in the art.

Similarly, data pairs including 3.9 milliamps and 11.32 milliamps (first two columns in Table I) were used with regression analysis to obtain the constants for algorithm or polynomial equation (2) $Y=a_0+a_1X+a_2X^2+a_3X^3+a_4X^4$. The coefficient of determination (COD), which is the measure of the fraction of the total variance account for by the equation or model was 1.00000000. This is an excellent fit of the predicted data pairs and the experimental data pairs as shown in the third and fourth columns of Table I between 3.9 mA through 6 mA. These data pairs are then placed into the smart indicator 58 (FIG. 4) as equation (2) in a manner well known in the art. The constants that are determined for equation (2) are as follows: $a_0=-110.683736$; $a_1=26.1049689$; $a_2=1.6799281$; $a_3=-0.36137862$; and $a_4=0.0205726$.

It should be noted that if industrial computer 58 is used in place of a smart indicator, the actual algorithm (one or more equations such as equations (1) and (2) derived by linear regression) could be used directly as a formula by the industrial computer 58 and not as discrete (separate pairs of data) pairs as required by the smart indicator. The end result would be a greater degree of accuracy to be expected from using an industrial computer 58.

In summary, the data pairs in the first two columns of Table I and obtained from sensor 32 are coupled on line 55 to computer 56 for regression analysis and development of the algorithm, which is then stored in the industrial computer or smart indicator 58.

Figure 5:
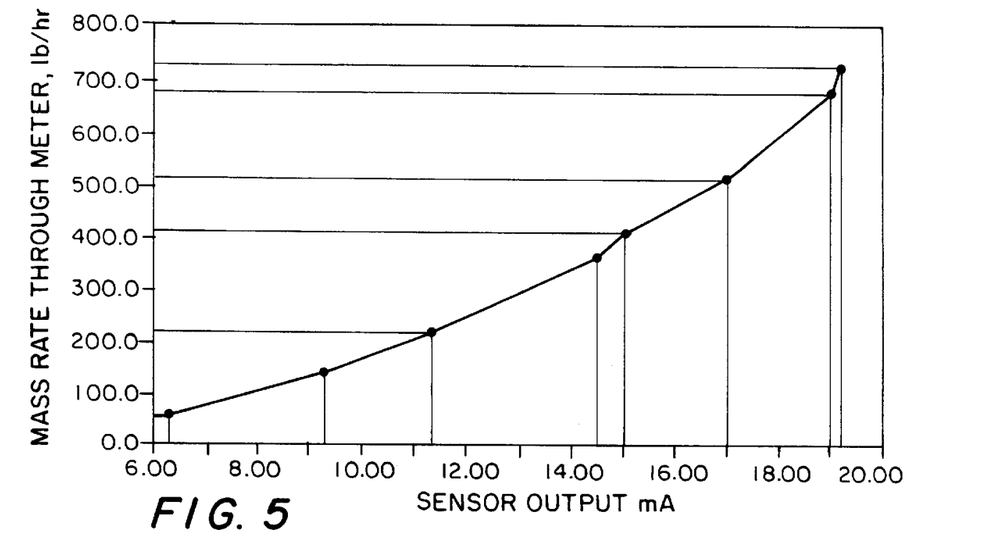
FIG. 5 is a graph of mass rate through the meter in pounds-per-hour versus sensor output in milliamps illustrating the original non-linear calibration data used to create an algorithm.

The non-linear results of the sensor output in these tests are shown in the graph of FIG. 5 that plots sensor output versus mass rate through the meter. Note that the sensor output is non-linear.

Figure 6:
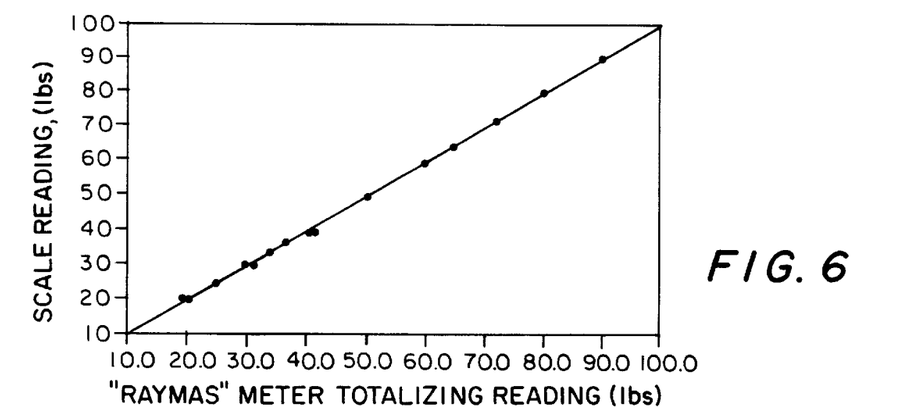
FIG. 6 is a graph illustrating the accuracy of the calibrated flow meter utilizing rolled oats.

Once the meter has been calibrated as indicated previously, a test result utilizing rolled oats is illustrated in the graph of FIG. 6 which compares the meter totalizer reading in pounds versus the scale reading in pounds. Notice the accuracy of the meter is within +/−0.5% over the entire range.

Figure 7:
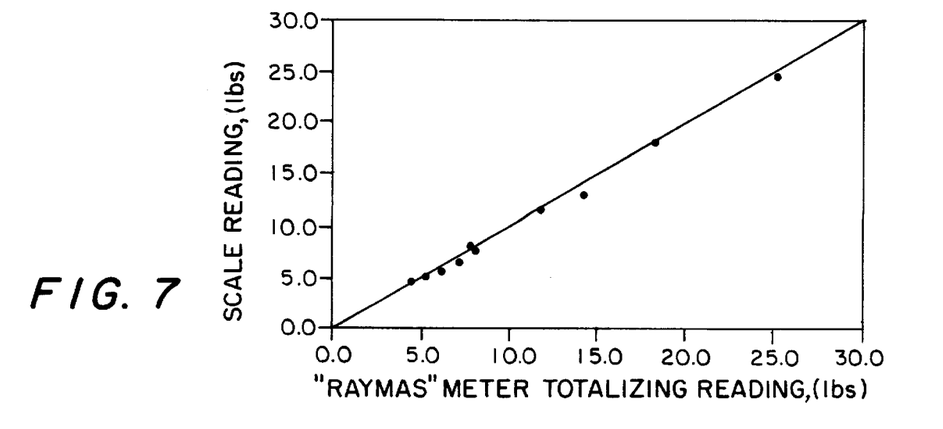
FIG. 7 illustrates the accuracy of the calibrated flow meter for a "Certa" product.

FIG. 7 is a graph illustrating the results from the calibrated mass flow meter for "Certa" Product from General Mills, Inc. The accuracy is +/−1.9%. The material being measured had poor flowability characteristics and it was difficult to maintain constant mass rates. Thus, the accuracy of +/−1.9%.

Figure 8:
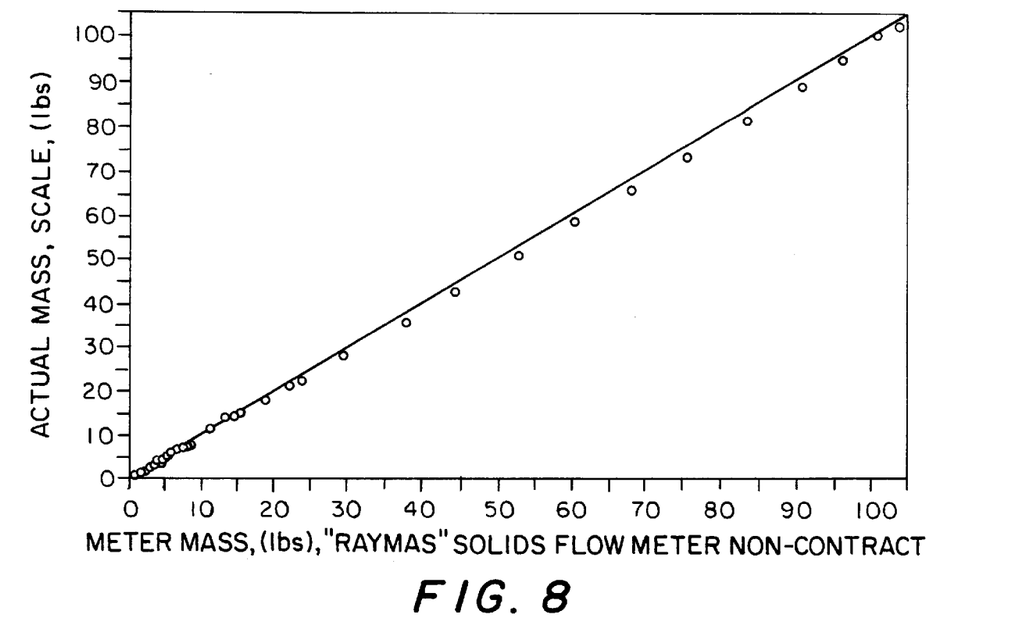
FIG. 8 is a graph illustrating the accuracy of the calibrated meter for use with a berry type cereal.

FIG. 8 is a graph illustrating the accuracy of the calibrated flow meter measuring Crunch Berries® from Quaker Oats Company. An accuracy of +/−1.63% was obtained in the upper range and +/−2.24% in the overall range. Only one equation was used to make up the algorithm, equation (1), and it provided the best fit over a portion of the range. If more than one equation had been utilized, the accuracy would have been improved substantially for this case.

Figure 9:
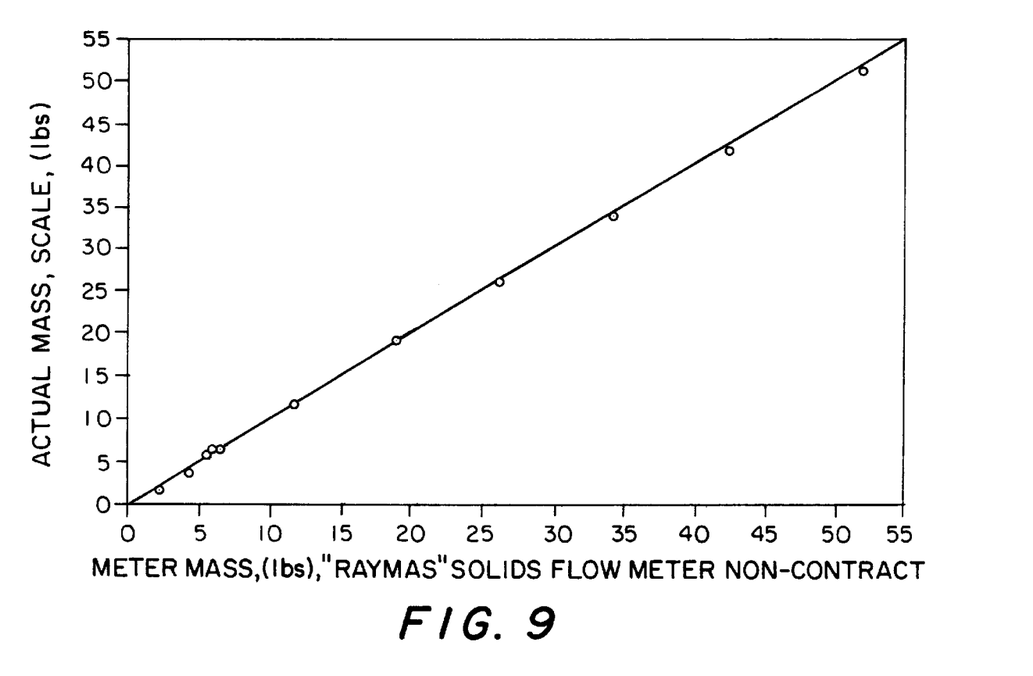
FIG. 9 illustrates the accuracy of the calibrated meter utilizing a Life® Cereal product, re-mill stream.

FIG. 9 is a graph setting forth the accuracy of the calibrated flow meter for measuring Life® Cereal from Quaker Oats Company. As can be seen, an accuracy of +/−0.68% was obtained in the upper range and +/−2.86% in the overall range. Again, only one equation was used to make up the algorithm. The use of both algorithms (1) and (2) would provide a much greater accuracy.

Thus, in the present flow meter, the sensor tube must have a diameter at least equal to the flow tube. This will allow beam to contact the entire cross-sectional area of the flow tube and thus all particulate materials flowing through the flow tube will come in contact with the beam and cause reflected energy. The flow tube may be a round, square, or rectangular cross-sectional shape. The signal from the sensor is conditioned by at least one algorithm to relate the sensor output to mass rate and quantity (totalizer). The first algorithm is of the power function type $Y_1=aX^b$ where X is the independent variable (sensor output in mA), Y is the dependent variable (mass rate), and "a" and "b" are constants obtained from statistical analysis. The second algorithm or equation is of a polynomial function of the type $Y_2=a_0+a_1X+a_2X^2+a_3X^3+a_4X^4$ where, again, X is the independent variable, $Y_2$ is the dependent variable, and $a_0$, $a_1$, $a_2$, $a_3$, and $a_4$ are constants obtained from statistical analysis. Thus, in one embodiment the algorithm is a combination of a polynomial function and a power function in order to correlate the sensor output with the matching mass rates over the entire range so as to obtain accurate indications of mass rate and quantity. It is to be understood, of course, that even greater accuracy could be obtained by utilizing further equations such as $Y_3=ae^{bX}$, where a and b are constants, $Y_3$ is the mass rate, and X is sensor output in milliamps for some specific range between 4 to 20 milliamps. Again, the constants would be determined by regression analysis. Further, an equation such as $Y_4=e^{a+bX}$ could also be utilized, where a and b are constants, $Y_4$ is the mass rate, and X is the sensor output in milliamps for some specific range between 4 and 20 milliamps with the constants being determined by regression analysis from specific points as set forth earlier. Also $Y=a+bX$ could also be used where X, Y, a, and b have the definitions set forth above.

First, for example, in calibrating the meter for a specific material, a fixed or constant particulate solid rate (mass rate) is passed through the meter and corresponding sensor output is recorded. This step is repeated until the mass rates corresponding to the sensor's output range from 4 to 20 milliamps is determined.

Second, the total output sensor data from 4–20 milliamps and the corresponding mass rate data are analyzed mathematically (typically by regression analysis such as the method of least squares) to determine which of the mathematical equations ($Y_1$, $Y_2$, $Y_3$, or $Y_4$) best fit the data. One equation may fit the date over the entire 4–20 milliamp range accurately or two or more equations may be needed to accurately fit the data over the entire range. Thus, again, as an example, using three equations, the mass rate Y and the sensor output X could be represented over the entire sensor output range of 4–20 milliamps by the following algorithm which uses three equations:

---

$Y = a_{0,1} + a_{1,1}X + a_{2,1} X^2 + a_{3,1}X^3 + a_{4,1}X^4$
(for the sensor output range X from 4 to ≤5.6 milliamps)

$Y = a_{1,2}X_2^{b1,2}$
(for the sensor output range $X_2$ from >5.6 to ≤18.1 milliamps)

$Y = a_{1,3}e^{b1,3\ X3}$
(for the sensor output range $X_3$ from >18.1 to ≤20 milliamps).

---

It is understood in the above example that the constants $a_{0,1}$, $a_{1,1}$, $a_{2,1}$, $a_{3,1}$, and $a_{4,1}$, are determined by mathematical methods such as regression analysis using the mass rate data and corresponding sensor output data for the sensor output range from 4≤5.6 milliamps; the constants $a_{1,2}$ and $b_{1,2}$ are determined by mathematical methods such as regression analysis using the mass rate data and corresponding sensor output data for the sensor output range from >5.6 to ≤18.1 milliamps; and the constants $a_{1,3}$ and $b_{1,3}$ are determined by mathematical methods such as regression analysis using the mass rate data and corresponding sensor output data for the sensor output range from >18.1 to ≤20.00 milliamps.

The above, of course, is just an example. Many different equations may be used to obtain a desired algorithm for better accuracy.

Figure 10:
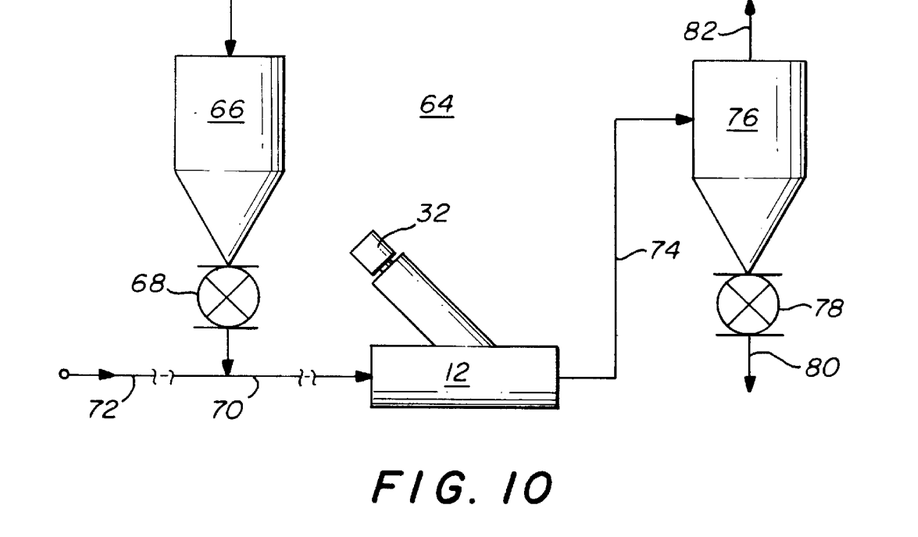
FIG. 10 is a diagrammatic representation of a typical pneumatic conveying non-contact solids flow meter.

FIG. 10 is a variation of the present flow meter that utilizes pneumatic conveying of the flowable material. In this case, the materials are provided from hopper 66 through a rotary air lock 68 to a flow tube 70. The pneumatic conveying gas or vapor inlet at 72 conveys the material through tube 70, the solids flow meter 12, and the output line 74 to a product receiver 76. The material in the receiver may be conveyed through air lock 78 to a product out-flow line 80. The pneumatic conveying gas or vapor may flow out at 82. The sensor 32 in the solids flow meter 12 operates as described previously. The gas or vapor velocity used to transport the particulate solid material through a duct should be nearly the same during the calibration of the flow meter as it will be for induced conditions under which the meter will finally operate.

Figures 11A, 11B, 11C:
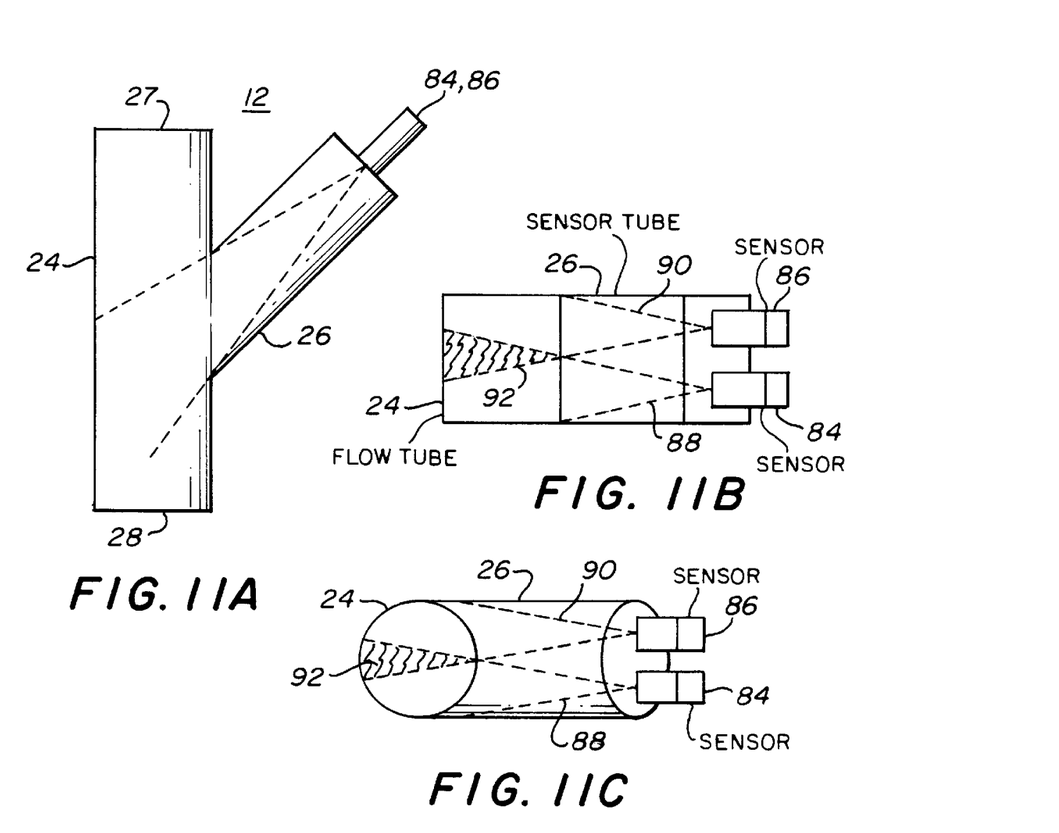
FIG. 11A is a side view of a flow tube utilizing at least two sensors.
FIG. 11B is a top view of a rectangular flow tube utilizing two sensors.
FIG. 11C is a top view of a circular flow tube utilizing two sensors.
Figure 12:
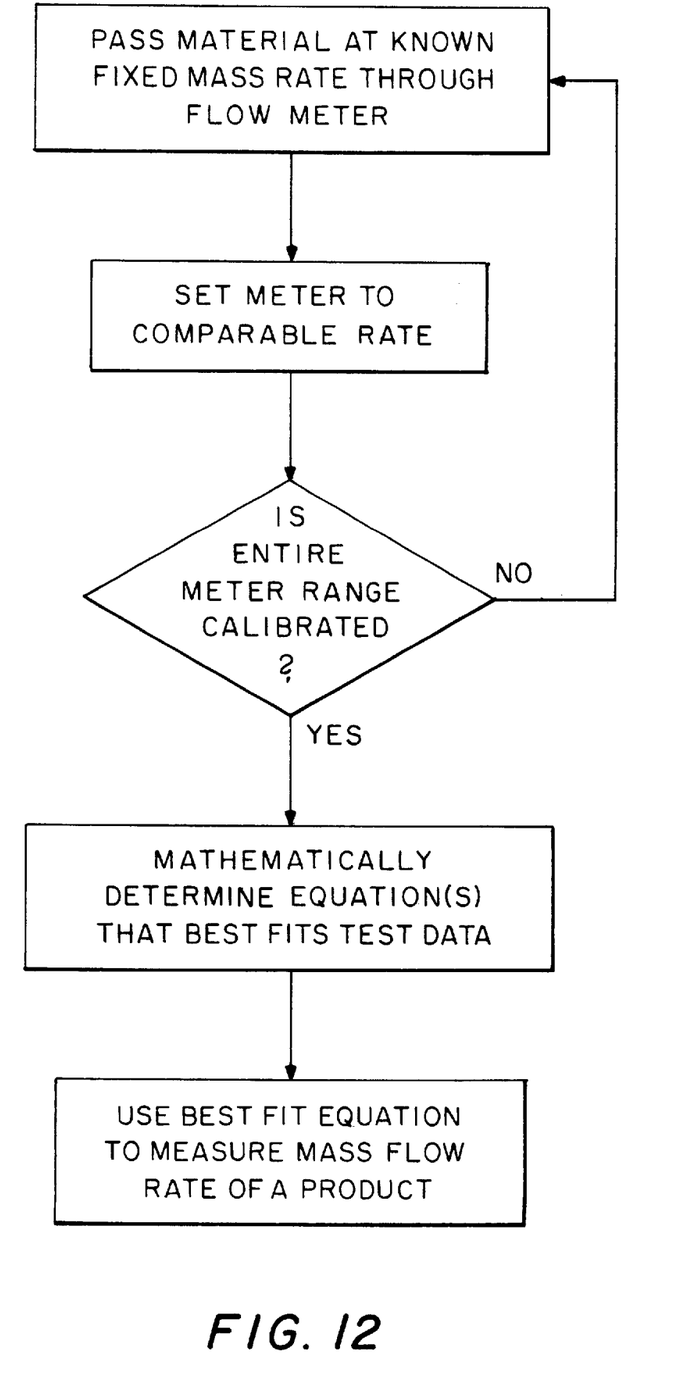
FIG. 12 is a flow chart illustrating th method of detecting the particulates according to the present invention.

After understanding the above, it is logical that one could use two or more sensors side-by-side and adjust the distance between the sensors and the distance from the sensors to the flow tube and therefore cover the entire cross-sectional area of the flow tube. Thus, two or more sensors could be used with this concept. Such a concept with two sensors is illustrated in FIGS. 11A, 11B, and 11C. In 11A, a side view of the flow tube is shown with the beams 88, 90 being illustrated as one beam inasmuch as they are parallel and are provided by sensors 84 and 86, only one of which can be seen in the side view in FIG. 11A.

FIG. 11B is a top view of a rectangular flow tube 24 with two sensors 84 and 86 positioned on the sensor tube 26. Sensor 84 generates beam 88 and sensor 86 generates beam 90. It will be noted that the beams 88 and 90 include and overlap area 92. This same overlap area is illustrated in FIG. 11C which is a top view of a circular flow tube. Note that the distance of the sensors 84 and 86 from flow tube 24 is adjusted such that their beams 88 and 90 intersect at the outer periphery of the flow tube to ensure that the entire flow tube is covered by the beams 88 and 90. The two sensors 84, 86 send out beams 88 and 90 of low microwave energy at the same fixed frequency. The moving particles reflect the energy beams and thereby the receivers at the sensors measure the total reflected Doppler-shifted energy. Since the moving particles create a Doppler-shifted energy that is reflected back to the sensors 84 and 86, the sensors 84 and 86 measure the intensity of the total signal reflected back. An average of the two sensor signals is taken. Thus, the average of the sensors' output signals is the "X" in equations (1) and (2) (algorithms 1 and 2). Then the two equations $Y_1$ and $Y_2$ could be used to represent the algorithm. Thus, the average output from the sensors is mathematically correlated with the total mass rate through the meter. This is the typical calibration method described earlier herein using only one sensor output signal. With two or more sensor outputs, an average value is used or some weighted average mathematical value of the sensor output signal is used and is correlated with the mass rate.

Thus, there has been disclosed a novel Doppler-radar flow meter wherein the sensor tube is at least the same diameter as the flow tube so that the sensor beam can cover the entire cross-sectional area of the flow tube in order that all particulate materials flowing through the flow tube will come in contact with the beam and provide reflected Doppler-shifted energy. In addition, from the generation of actual flow rates versus sensor output signal (in milliamps or volts or in a converted digital readout) one or more equations can be used to determine a best fit so that the smart indicator can determine an accurate flow rate through the meter. The constants in the equations are determined by regression analysis in a well-known manner. Further, two or more sensors can be used if desired to obtain even further accuracy.

The corresponding structures, materials, acts, and equivalents of all means or step plus function elements in the claims below are intended to include any structure, material, or act for performing the function in combination with other claimed elements as specifically claimed.

What is claimed is:

1. A flow meter for measurement of the mass flow rate of solid particulate matter comprising:

a first hollow conduit forming a flow path along which the solid particulate matter moves;

a second hollow conduit having at least the same diameter as the first conduit, and being joined to the first conduit at an angle;

at least one sensor associated with said second hollow conduit, said at least one sensor including:

a transmitter of electromagnetic energy for radiating the entire particulate matter flow path formed by said first conduit such that substantially all of the particulate matter contributes to and forms back scattered energy;

a receiver for receiving said backscattered energy and generating an electrical signal that is proportional to the concentration of solid particulate matter flowing in said first hollow conduit; and processor means coupled to said at least one sensor for generating an output signal representative of said concentration of solid particulate matter.

2. A flow meter as in claim 1 wherein said solid particulate matter flows past said sensor at a substantially constant velocity for purpose of calibration.

3. A flow meter as in claim 2 further comprising a source of said particulate matter located a predetermined distance above said sensor for achieving said substantially constant velocity by gravity flow.

4. A flow meter as in claim 2 further comprising a source of pneumatic pressure coupled to said first conduit for conveying said particulate matter past said sensor at said substantially constant velocity.

5. A flow meter as in claim 1 further comprising a sightglass interposed in said second hollow conduit between said sensor and said particulate matter to form a non-contact flow meter.

6. A flow meter as in claim 1 wherein said second conduit is joined to said first conduit at an angle from the vertical in the range of about 10° to about 90°.

7. A flow meter as in claim 6 wherein the preferred angle between said first and second conduits is in the range of about 10° to about 35°.

8. A flow meter as in claim 1 wherein the receiver is a Doppler receiver that measures the frequency difference between the transmitted energy and that scattered energy received from the moving particulate matter.

9. A flow meter as in claim 1 wherein the electrical signal generated by said receiver is a non-linear signal.

10. A flow meter as in claim 9 wherein said non-linear electrical signal generated by said receiver is in milliamps.

11. A flow meter as in claim 9 wherein said non-linear electrical signal generated by said receiver is in volts.

12. A flow meter as in claim 10 wherein said processor means converts said milliamps signal into a pounds/hour mass flow rate.

13. A flow meter as in claim 1 wherein said processor means includes memory means for storing a first algorithm for converting the signal generated by said receiver in a first range of values to a pounds/hour mass flow rate and storing a second algorithm for converting the signal generated by said receiver in a second continuous range of values to a pounds/hour mass flow rate to enhance accuracy of the flow meter.

14. A flow meter as in claim 13 wherein said first algorithm has the form of $Y=aX^b$, where Y=pounds/hour, X=milliamps, and a and b are constants and said second algorithm has the form of $Y=a_0+a_1X+a_2X^2+a_3X^3+a_4X^4$ where Y=pounds/hour, X=milliamps, and $a_0$, $a_1$, $a_2$, $a_3$, and $a_4$ are constants.

15. A flow meter as in claim 14 wherein said processor means is an industrial computer.

16. A flow meter as in claim 15 further including a central processing unit coupled between said receiver and said industrial computer for calculating said constants for said first and second algorithms for use by said industrial computer.

17. A flow meter as in claim 14 wherein said processor means comprises:

a central processing unit for calculating said constants for said first and second algorithms and generating said mass flow rate in pounds/hour; and converting means in said central processing unit for converting said mass flow rate to total pounds.

18. The flow meter of claim 1 wherein said at least one sensor includes:

first and second sensors associated with said second conduit, each of said sensors comprising:

a transmitter of electromagnetic energy for radiating at least a first portion of the particulate matter flow path to cause backscattered energy;

an associated receiver for receiving the backscattered energy from its associated transmitter; and said processor means being coupled to both said first and second sensors for generating an output signal representative of the concentration of said particulate matter.

19. The flow meter as in claim 1 wherein said processor means includes memory means for storing at least one algorithm for converting the signal generated by said receiver into a continuous range of values to a pounds-per-hour mass flow rate.

20. A method of measuring mass flow rate of a solid particulate matter comprising the steps of:

conveying the particulate matter through a first hollow conduit;

transmitting electromagnetic energy through a second hollow conduit attached to said first hollow conduit at an angle;

said second hollow conduit having at least the same diameter as the first hollow conduit;

radiating substantially all of said particulate matter in said first conduit as it passes said second hollow conduit to form a signal from backscattered electromagnetic energy;

receiving said backscattered energy signal from said particulate matter; and converting said received backscattered energy signal to mass flow rate in pounds/hour.

* * * * *